United States Patent
Baur et al.

[11] Patent Number: 6,028,371
[45] Date of Patent: Feb. 22, 2000

[54] PROCESS FOR DIRECTION-SELECTIVE ORIENTATION OF A PASSIVE SAFETY DEVICE

[75] Inventors: Richard Baur, Pfaffenhofen; Christian Held; Hermann Küblbeck, both of Schrobenhausen; Helmut Steurer, Gerolsbach; Alfons Wöhrl, Schrobenhausen, all of Germany

[73] Assignee: Temic Telefunken microeletronic GmbH, Heilbronn, Germany

[21] Appl. No.: 09/059,342

[22] Filed: Apr. 14, 1998

[30] Foreign Application Priority Data

Apr. 15, 1997 [DE] Germany .......................... 197 15 575

[51] Int. Cl.[7] .................................................. B60R 21/32
[52] U.S. Cl. ........................ 307/10.1; 180/282; 280/734; 340/436; 701/45
[58] Field of Search .......................... 307/10.1; 73/1.38; 180/282; 280/728.1, 734; 340/436; 701/45, 70; 706/905

[56] References Cited

U.S. PATENT DOCUMENTS

| 5,440,913 | 8/1995 | Crispin et al. | 180/282 |
| 5,583,771 | 12/1996 | Lynch et al. | 701/45 |
| 5,684,701 | 11/1997 | Breed | 180/282 |
| 5,777,225 | 7/1998 | Sada et al. | 340/436 |
| 5,802,480 | 9/1998 | Shiraishi | 701/45 |

FOREIGN PATENT DOCUMENTS

| 0649777A1 | 4/1994 | European Pat. Off. . |
| 3717427 | 12/1988 | Germany . |
| 3733837 | 4/1989 | Germany . |
| 3736294A1 | 5/1989 | Germany . |
| 4116336 | 6/1992 | Germany . |
| 19537546A1 | 4/1997 | Germany . |
| WO 94/12886 | 6/1994 | WIPO . |

*Primary Examiner*—Albert W. Paladini
*Attorney, Agent, or Firm*—Venable; George H. Spencer; Norman N. Kunitz

[57] ABSTRACT

A process and a mechanism for the direction-selective triggering of a passive safety device in a vehicle, with at least two acceleration transducers, where the acceleration transducers have directional sensitive axes and these have actual instantaneous orientations and are aligned in different, preferably specified reference orientations and there is an angle tolerance between the reference and the instantaneous orientations of the sensitive axes. An evaluation device is provided to correct the angle tolerance, comprising an electronic circuit which converts the signals (am 1, am 2, ... am n) coming from the acceleration transducers to corrected output signals (a(I), a(II), . . . a(n)), which are linear combinations of the incoming signals with adjustable factors $c_{ij}$:

$$a(I) = c_{11} * am1 + c_{12} * am2 + \ldots + c_{1n} * amn$$
$$a(II) = c_{21} * am1 + c_{22} * am2 + \ldots + c_{2n} * amn$$

$$a(n) = c_{n1} * am1 + c_{n2} * am2 + \ldots + c_{nn} * amn.$$

This can lessen the expense of production compared to familiar mechanisms, without simultaneously reducing the measuring accuracy of the mechanism. In particular, if acceleration transducers with considerably higher angle tolerances are used, it is possible to achieve a higher level of measuring accuracy and sensitivity can be equalized and angle tolerance offset simultaneously in a single, inexpensive operation.

8 Claims, 2 Drawing Sheets

6,028,371

PROCESS FOR DIRECTION-SELECTIVE ORIENTATION OF A PASSIVE SAFETY DEVICE

BACKGROUND OF THE INVENTION

The invention concerns a process and an accompanying mechanism for the direction-selective triggering of a passive safety device in a vehicle, particularly relevant to an airbag system when the vehicle is involved in a crash. It has at least two acceleration transducers with directional sensitive axes and these sensitive axes are aligned in different directions. It also has an evaluation device which picks up the signals from the acceleration transducers, processes them and makes output signals available to trigger the passive safety device.

The invention also concerns a process to determine factors.

Process and mechanism for the direction-selective triggering of a passive safety device in a vehicle are familiar, for example, from DE 37 17 427, DE 37 33 837 C2 or DE 41 16 336 C1.

Nowadays, practically all new cars are equipped with airbags to provide passive protection for the occupants of the vehicle. In the event of a crash, the airbags are inflated very quickly by gas, protecting the passengers sitting behind them from the consequences of a crash or at least considerably reducing the amount of damage caused by the accident.

The optimum trigger time for airbags is amongst other things, a function of the angle at which the vehicle collides with an obstruction or an oncoming vehicle. This can usually be taken into account in trigger units for airbags or in other passive safety devices, such as seatbelt constraint systems, by two acceleration transducers. But when the acceleration transducers are manufactured, when the acceleration transducers are mounted on a board, when the board is fitted into equipment housing and when the equipment is installed in the vehicle, angle tolerances distort the accuracy of the angle information, making it impossible to achieve the optimum triggering instant.

In principle, the direction sensitivity of acceleration sensitive elements such as piezoelectric components, is generally really good. However, the uncertainty in the measurement result generally comes from inaccuracies during installation of the acceleration sensitive elements in the acceleration transducer housing, the acceleration transducer on the board, the board in the housing and the finished unit in the vehicle. Distortion of a signal working in the acceleration transducer's direction of maximum sensitivity, is less to blame for the error in measurement. It is more a case of the greatest distortion being experienced by those signal components which are applied perpendicularly. In the data sheets, this value is usually called cross sensitivity, but in almost all cases, it is nothing more than the angle of torsion, at which the acceleration sensitive element can be installed, compared to the nominal angle of its directional sensitive axis.

It would be extremely expensive to manufacture acceleration transducers with a sufficiently low angle tolerance and to install them accurately enough in the unit and in the vehicle. That is why the familiar mechanisms are either expensive to manufacture, because components with particularly precise angle sensitivity have to be used, or expensive to install and therefore more expensive, because if less precise components are used, once they are installed, sensitivity has to be equalized with great accuracy and the angle tolerance offset.

SUMMARY OF THE INVENTION

The object of the invention is to provide a mechanism with the attributes described at the start, where it is possible to reduce the expense of production, compared with familiar mechanisms, without simultaneously reducing the measuring accuracy of the mechanism. Even with acceleration transducers with considerably higher angle tolerances, it must be possible to achieve a high level of measuring accuracy, and simultaneous sensitivity equalization and angle tolerance compensation must be possible in one inexpensive operation.

According to the invention, the answer is surprisingly simple, but effective. The evaluation device must comprise an electronic circuit which converts n signals am 1, am 2, … am n, coming from n $\geq 2$ acceleration transducers, to n output signals a(I), a(II), … a(n), where output signals a(I), a(II), … a(n) are linear combinations of the incoming signals am 1, am 2, … am n, with adjustable factors $c_{ij}$:

$$a(I) = c_{11}*am1 + c_{12}*am2 + \ldots + c_{1n}*amn$$

$$a(II) = c_{21}*am1 + c_{22}*am2 + \ldots + c_{2n}*amn$$

$$\ldots$$

$$a(n) = c_{n1}*am1 + c_{n2}*am2 + \ldots + c_{nn}*amn.$$

With the mechanism according to the invention, the acceleration signals from the acceleration transducers which are to be evaluated are not forwarded immediately to trigger the passive safety device. But neither is the amplitude of each signal evaluated in an evaluation circuit, as was the case in DE 37 17 427 A1 cited above, nor are certain signals selected and others suppressed, as described in DE 37 33 837 C2.There is no sampling of the waveform to determine leading edges or threshold values, as proposed in DE 41 16 336 C1. With the mechanism according to the invention, it is more a case of generating from the incoming n signals from n acceleration transducers, a relevant number of n output signals, each comprising a certain linear combination of all the incoming signals. Factors $c_{ij}$, with which the input signals enter the output signals pro rata, are adjustable. This means that the mechanism according to the invention can be used in a simple procedure, as described below, to carry out angle correction and at the same time adjust sensitivity, by adjusting the relevant factors $c_{ij}$.

It is a particularly preferred embodiment of the mechanism according to the invention, for the electronic circuit to comprise an analog/digital converter (ADC) to digitize n signals am 1, am 2, … am n coming from the acceleration transducers and a microprocessor to convert the digitized signals to n output signals a(I), a(II), … a(n). In particular, if the signals are digitized close to the acceleration transducers, they can even be transported over relatively long distances without distortion. Generation of the output signals as a linear combination of the digitized input signals is quick and easy with a microprocessor.

It is advantageous to develop this embodiment to link the microprocessor to a memory unit, in which adjustable factors $c_{ij}$ are stored as digitized data. This will enable the microprocessor to create the required linear combinations in the shortest possible time.

In a particularly advantageous development of the embodiment, the memory unit will contain one or more EEPROM units. This will mean that electrical pulses can write or overwrite the memory unit with the chosen set of factors $c_{ij}$, at any time, without having to provide permanent voltage to retain the data, as was the case with RAM An alternative embodiment has as the electronic circuit an analog circuit, comprising in particular a number of operational amplifiers. Instead of digital processing, it is possible to use very simple electronic components to carry out the analog evaluation and conversion of incoming signals to output signals comprising linear combinations of input signals.

It is particularly easy to present a development of this embodiment, where factors $c_{ij}$ can be adjusted by tunable ohmic resistances $R_{ij}$.

The scope of the invention also covers a process to correct angle and/or sensitivity errors for acceleration transducers in a mechanism of the type described above. The process involves the following steps:

sequential input of n known acceleration signals in n different directions to n acceleration transducers and measurement of the resulting n×n output signals $a(I)_1$, $a(I)_2$; ... $a(I)_n$; $a(II)_1$, $a(II)_2$, ... $a(II)_n$; ... ; $a(n)_1$, $a(n)_2$, ... $a(n)_n$ determining factors $c_{ij}$ from the measured output signals in accordance with $$\{c_{ij}\} = \{R_{ij}\} \begin{pmatrix} a(I)_1 & \cdots & a(I)_n \\ \vdots & \vdots & \vdots \\ a(n)_1 & \cdots & a(n)n \end{pmatrix}^{-1}$$

where $\{c_{ij}\}$, an n×n matrix constructed from factors $c_{ij}$ and $\{R_{ij}\}$, a correction matrix, are the specified theoretical values which can ideally be expected from the known acceleration signals. If there are orthogonal acceleration signals of the same amplitude, $\{R_{ij}\}$ can be simplified to unit matrix $\{E\}$.

BRIEF DESCRIPTION OF THE DRAWINGS

The invention is described in more detail by using embodiment examples and referring to the figures. These are.

DESCRIPTION OF THE PREFERRED EMBODIMENTS

Figure 3:
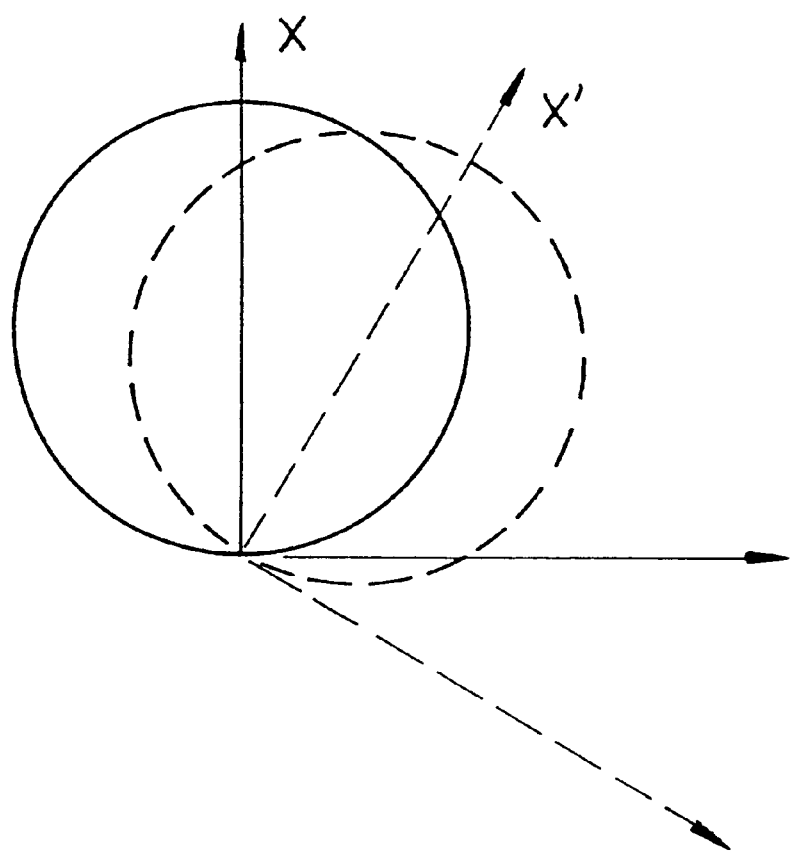
FIG. 3 the directional characteristics of an ideal and ideally installed acceleration transducer, compared to an acceleration transducer which is real and/or installed full of tolerances.

FIG. 3 is a diagram of the problem discussed above of angle errors arising when an acceleration transducer with a directional sensitive axis is used. In the example shown, a circle drawn as a continuous line shows the directional characteristics of an ideal and ideally installed acceleration transducer in the direction of an x axis. Transducer tolerances and a non-ideal installation produce an angle error, shown in FIG. 3 by the broken lines. If an error-laden, real acceleration transducer of this type is to provide signal data that is even halfway useful, it usually requires an expensive procedure to equalize or offset the angle and sensitivity errors, after final installation in the relevant unit or vehicle. To simplify this operation considerably, we propose, according to this invention, that a mechanism for the direction-selective triggering of a passive safety device in a vehicle, having at least two acceleration transducers with directional sensitive axes, should have an evaluation device. This evaluation device should pick up incoming signals from the acceleration transducers and use adjustable factors $c_{ij}$ to generate linear combinations of the incoming signals, as output signals. This makes it possible, in a single operation, to compensate simultaneously for sensitivity differences in the acceleration transducers and for all angle tolerances within the trigger unit housing.

Below, the situation used to describe the invention is one where n =2 acceleration transducers, with sensitive axes running in an x or a y direction, where the x axis should be perpendicular to the y axis. It is possible to have more acceleration transducers, for example, to cover the vehicle overturning and to adapt the process and mechanism according to the invention.

The accelerations to be evaluated are not obtained directly from the acceleration transducer signals, as is possible with the state of the art, but according to the invention, are obtained through a linear combination of these signals.

$$a(I) := c_{11} * am1 + c_{12} + am2 \qquad (1)$$
$$a(II) := c_{21} * am1 + c_{22} * am2$$

$c_{ij}$ are the adjustable factors still to be determined, am 1 and am 2 are the acceleration signals of the two acceleration transducers which, as described above, are installed full of angle errors. The processed signals coming from the evaluation device for triggering the passive safety device are designated a(I) and a(II).

Figure 1:
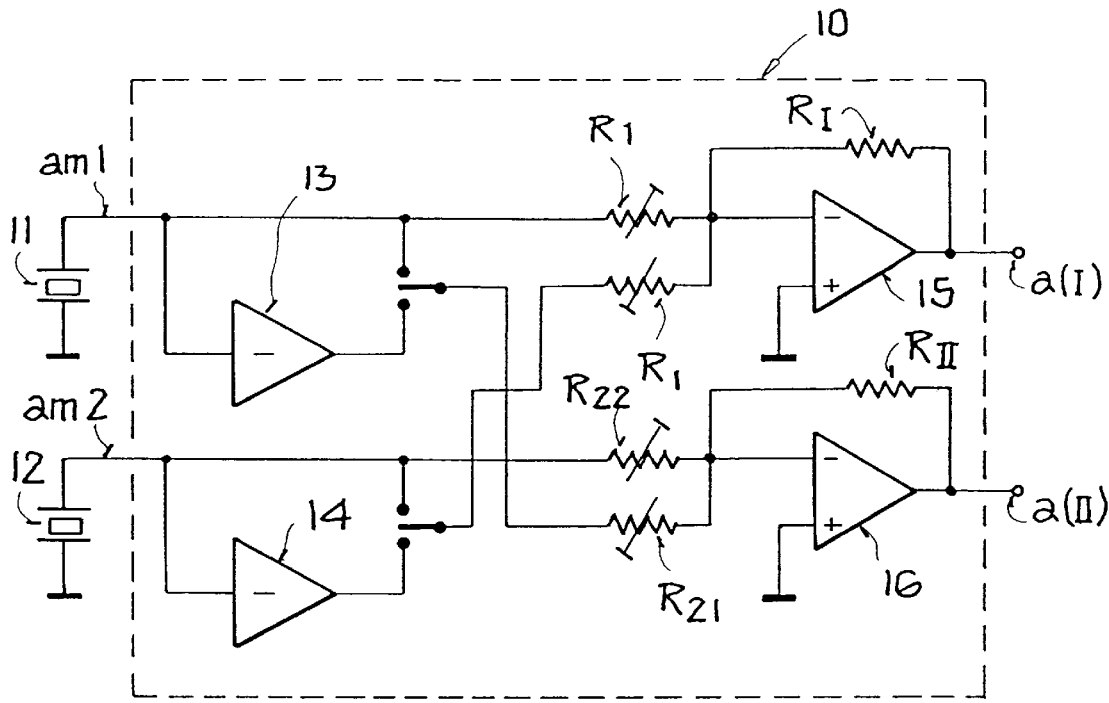
FIG. 1 a circuit diagram for an analog implementation of the mechanism according to the invention.

The circuit is described using the example of an analog circuit, as shown in FIG. 1. From two acceleration transducers 11, 12, which can, for instance, be equipped with piezoelectric components, acceleration signals am 1 or am 2 are forwarded to an evaluation device 10, which comprises an electronic analog circuit. Input signals am 1 and am 2 are each split and one portion is fed directly through an adjustable resistor $R_{11}$ or $R_{22}$, to the negative input of an operational amplifier 15 or 16, while a second portion is forwarded through a NOT circuit 13 or 14 to invert the signal sign and through a variable resistor $R_{21}$ or $R_{12}$, through an intersection the negative input of the other operational amplifier 16 or 15.

The adjustable resistors $R_{11}$, $R_{12}$, $R_{21}$ and $R_{22}$ can be used to adjust the respective factors $c_{11}$, $c_{12}$, $c_{21}$ and $c_{22}$ from equation (1). Suitable electronic elements, such as resistors $R_I$ and $R_{II}$, interconnect operational amplifiers 15, 16 in such a way that output signals a(I) and a(II) are normalized to a defined unit value.

Figure 2:
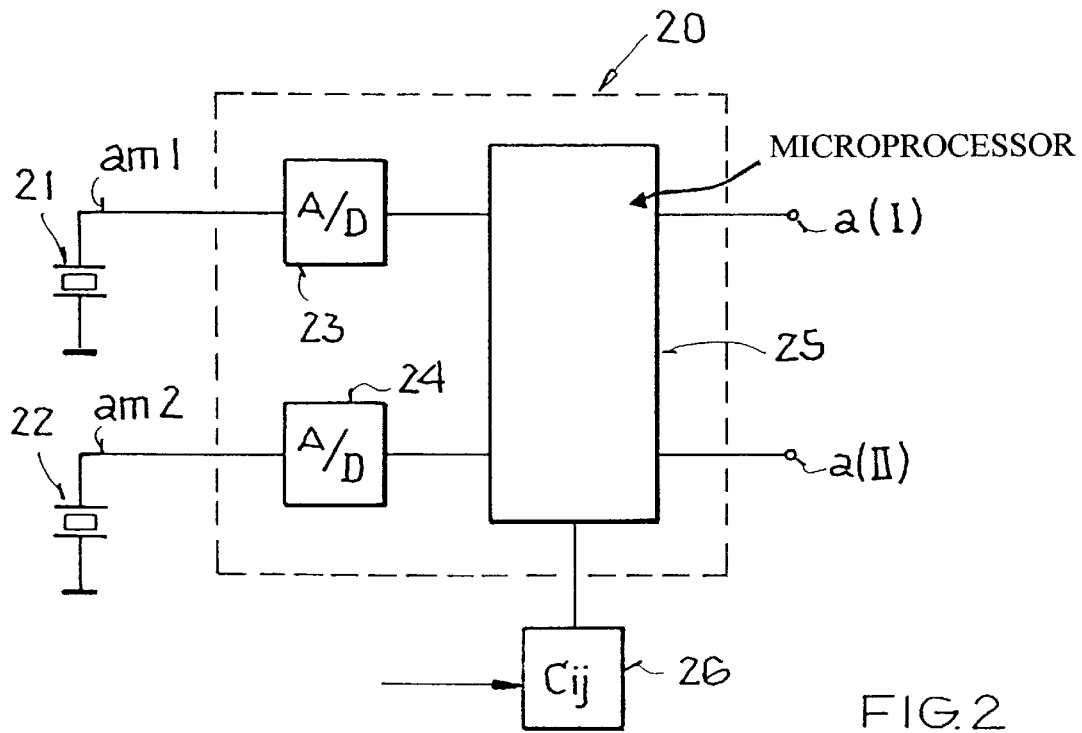
FIG. 2 a circuit diagram of a digital version of the mechanism according to the invention.

FIG. 2 shows a diagram of a digital evaluation device 20 and acceleration signals am 1 and am 2 from acceleration transducers 21 and 22 are entered at its input. The analog, incoming signals am 1 and am 2 are digitized by analog/digital converters 23 and 24 and fed to a computer, such as a microprocessor 25. This is linked to a memory unit 26, which preferably contains one or more EEPROM units. In memory unit 26, adjustable factors $c_{ij}$ are stored, for determining linear combinations in accordance with equation (1). These can be overwritten. Micro processor 25 can thus generate output signals a(I) and a(II) from input signals am 1 and am 2, in accordance with equation (1).

Once production of the acceleration transducers is complete, the constants are first set, so that $c_{11}=1$, $c_{12}=0$, $c_{21}=0$, $c_{22}=1$. This setup will then apply a known acceleration signal, for instance, in the x direction and measure the responses of the two channels, designated a(I)x and a(II)y below. The same procedure occurs with a known acceleration signal in the y direction and results in the output signals a(I)y and a(II)y.

To keep it simple, the assumption has been made below that the two signals are orthogonal and have been normalized to "1". The factors $c_{ij}$, used to correct angle and sensitivity, thus produce $$\{c_{ij}\} = \begin{Bmatrix} a(I)_1 & \ldots & a(I)_n \\ \vdots & \vdots & \vdots \\ a(n)_1 & \ldots & a(n)n \end{Bmatrix}^{-1}$$

Where $\{\}^{-1}$ is the inverse matrix to $\{\}$.

Factors $c_{ij}$ determined in this way are entered in the circuit diagram under FIG. 1, by relevant tuning of resistors $R_{ij}$ or, for instance, entered into an EEPROM in a memory unit 26 in a digital circuit (20), in accordance with FIG. 2.

If real, not previously known accelerations are now measured in any direction, the linear combination under equation (1) produces those values which would have been determined by the acceleration transducers when calibrated to "1"and applied to a right-angled x/y system of coordinates, defined by the directions determined during equalization. In this way, the sensitivity differences of the acceleration transducers and all angle tolerances within the housing of the trigger unit can be offset in the same operation, in an extremely simple way.

Naturally, equalization itself is again prone to tolerances and so, therefore, are the coefficients of matrix $\{c_{ij}\}$. This can also be recorded in the correction matrix $\{R_{ij}\}$, which specifies the theoretical ideal values to be expected from the known acceleration signals.

Altogether, however, it can be assumed that this is a clear improvement, as long as the directions of maximum sensitivity of the two acceleration transducers are sufficiently different. But it is not a solution if the two main sensitivity directions are identical. In this case, the two acceleration transducers no longer set up a system of coordinates, and there is no longer a solution to equation (1).

The process according to the invention does not generally offset differences to the cosine characteristics of the acceleration transducers.

What is claimed is:

1. A process for the direction-selective triggering of a passive safety device in a vehicle, particularly relevant to an airbag system, where at least two acceleration transducers and one evaluation device are provided, to pick up the signals coming from the acceleration transducers, processes them and if the vehicle is involved in a crash, make output signals available to trigger the passive safety device, and the acceleration transducers have directional sensitive axes, where the sensitive axes have actual instantaneous orientations and are aligned in different and preferably specified reference orientations and there is an angle tolerance between the reference and instantaneous orientations of the sensitive axes wherein, there is angle correction, by converting the n signals (am 1, am 2, . . . am n) coming from n≧2 acceleration transducers to n output signals (a(I), a(II), . . . a(n)), where the output signals (a(I), a(II), . . . a(n)) are linear combinations of incoming signals (am 1, am 2, . . . am n) with adjustable factors ($c_{ij}$):

$$a(I) = c_{11} * am1 + c_{12} * am2 + \ldots + c_{1n} * amn$$
$$a(II) = c_{21} * am1 + c_{22} * am2 + \ldots + c_{2n} * amn$$
$$\vdots \quad \vdots \qquad\qquad\qquad\qquad \vdots$$
$$a(n) = c_{n1} * am1 + c_{n2} * am2 + \ldots + c_{nn} * amn.$$

2. A mechanism for direction-selective triggering of a passive safety device in a vehicle according to Patent claim 1, wherein the evaluation device comprises an electronic circuit which converts n signals (am 1, am 2, . . . am n) coming from n≧2 acceleration transducers to n output signals (a(I), a(II), . . . a(n)), where the output signals (a(I), a(II), . . . a(n)) are linear combinations of the incoming signals (am 1, am 2, . . . am n) with adjustable factors ($c_{ij}$):

$$a(I) = c_{11} * am1 + c_{12} * am2 + \ldots + c_{1n} * amn$$
$$a(II) = c_{21} * am1 + c_{22} * am2 + \ldots + c_{2n} * amn$$
$$\vdots \quad \vdots \qquad\qquad\qquad\qquad \vdots$$
$$a(n) = c_{n1} * am1 + c_{n2} * am2 + \ldots + c_{nn} * amn.$$

3. A mechanism according to claim 2, wherein the electronic circuit comprises at least one analog/digital converter to digitize n signals (am 1, am 2, . . . am n) coming from the acceleration transducers and a microprocessor to convert the digitized signals to n output signals (a(I), a(II), . . . a(n)).

4. A mechanism according to claim 3, wherein the microprocessor is linked to a memory unit, in which the adjustable factors ($c_{ij}$) are stored as digitized data.

5. A mechanism according to claim 4, wherein the memory unit contains one or more EEPROM units.

6. A mechanism according to claim 2, wherein factors $c_{ij}$ can be adjusted by tunable ohmic resistors.

7. A process to determine factors $c_{ij}$ for a mechanism according to claim 1, wherein there are the following steps to the process:

sequential impression of n known acceleration signals in n different directions to n acceleration transducers and measurement of the resulting n ×n output signals (a(I)$_1$, a(I)$_2$, . . . a(I)$_n$; a(II)$_1$, a(II)$_2$, . . . a(II)$_n$; . . . ; a(n)$_1$, a(n)$_2$, . . . a(n)$_n$)

determination of factors $c_{ij}$ from the measured output signals in accordance with $$\{c_{ij}\} = \{R_{ij}\} \begin{Bmatrix} a(I)_1 & \ldots & a(I)_n \\ \vdots & \vdots & \vdots \\ a(n)_1 & \ldots & a(n)n \end{Bmatrix}^{-1}$$

where $\{c_{ij}\}$ is an n×n matrix constructed from factors ($c_{ij}$) and a correction matrix $\{R_{ij}\}$ contains the specified theoretical values which can ideally be expected from the known acceleration signals.

8. Process according to claim 7, wherein correction matrix $\{R_{ij}\}$ is the unit matrix $\{E\}$, if the n known acceleration signals in n different directions are orthogonal and all the amplitudes of the acceleration signals have a specified unit value.

* * * * *